US 6,560,640 B2

(12) United States Patent
Smethers

(10) Patent No.: US 6,560,640 B2
(45) Date of Patent: *May 6, 2003

(54) REMOTE BOOKMARKING FOR WIRELESS CLIENT DEVICES

(75) Inventor: Paul A. Smethers, Cupertino, CA (US)

(73) Assignee: Openwave Systems, Inc., Redwood City, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/235,231

(22) Filed: Jan. 22, 1999

(65) Prior Publication Data

US 2003/0055870 A1 Mar. 20, 2003

(51) Int. Cl.[7] ............................................... C06F 17/30
(52) U.S. Cl. .................................... 709/219; 709/228
(58) Field of Search ............................ 358/473; 707/10, 707/104; 709/203, 206, 218, 219, 236, 228

(56) References Cited

U.S. PATENT DOCUMENTS

| | | | |
|---|---|---|---|
| 4,617,657 A | | 10/1986 | Drynan et al. |
| 5,199,104 A | | 3/1993 | Hirayama |
| 5,278,673 A | * | 1/1994 | Scapa et al. ............... 358/473 |
| 5,425,077 A | | 6/1995 | Tsoi |
| 5,481,539 A | | 1/1996 | Hershey et al. |
| 5,692,032 A | | 11/1997 | Seppänen et al. |
| 5,737,560 A | | 4/1998 | Yohanan |
| 5,751,708 A | | 5/1998 | Eng et al. |
| 5,761,280 A | | 6/1998 | Noonen et al. |
| 5,797,098 A | | 8/1998 | Schroeder et al. |
| 5,802,516 A | | 9/1998 | Shwarts et al. |
| 5,809,415 A | | 9/1998 | Rossmann |
| 5,895,471 A | * | 4/1999 | King et al. ................ 707/104 |
| 5,930,472 A | * | 7/1999 | Smith ........................ 709/203 |
| 6,049,831 A | * | 4/2000 | Gardell et al. ............. 709/236 |
| 6,138,151 A | * | 10/2000 | Reber et al. ................ 709/219 |
| 6,138,158 A | * | 10/2000 | Boyle et al. ................ 709/225 |
| 6,173,316 B1 | * | 1/2001 | De Boor et al. ........... 709/218 |
| 6,182,113 B1 | * | 1/2001 | Narayanaswami ......... 709/203 |
| 6,208,839 B1 | * | 3/2001 | Davani ...................... 455/31.3 |
| 6,243,739 B1 | | 6/2001 | Schwartz et al. |
| 6,272,129 B1 | * | 8/2001 | Dynarski et al. ........... 370/356 |
| 6,321,257 B1 | * | 11/2001 | Kotola et al. .............. 709/219 |

FOREIGN PATENT DOCUMENTS

| | | |
|---|---|---|
| JP | 10083241 | 3/1998 |
| WO | 97 22212 | 6/1997 |
| WO | 98 11744 | 3/1998 |

OTHER PUBLICATIONS

HDML 2.0 Language Reference, Version 2.0, Unwired Planet, Inc., Software Developer Kit, Jul. 1997.
"HDTP Specification", Version 1.1–Draft, Unwired Planet, Inc., Jul. 15, 1997.
UP.Browser™ User Handbook, Unwired Planet, Inc., Nov. 1977.
"Wireless Application Protocol Architecture Specification" (WAP Architecture), Version 30, Apr. 1998.

* cited by examiner

*Primary Examiner*—Christine Oda
*Assistant Examiner*—Walter Benson
(74) *Attorney, Agent, or Firm*—Beyer Weaver & Thomas, LLP

(57) ABSTRACT

Improved techniques that enable wireless devices to implement bookmarks with improved transmission efficiency, reduced user navigation and/or reduced amounts of memory resources are disclosed. One aspect of the improved techniques pertains to use of a compact request from a wireless device to an intermediate server when requesting a document or file by selection of a bookmark. Another aspect of the improved techniques is the ability of a user to select a bookmark to request the associated document or file with reduced user interaction (e.g., a single button action). Still another aspect of the improved techniques is that memory resources of the wireless devices need not be consumed to store network addresses (e.g., URLs) for the bookmarks.

34 Claims, 9 Drawing Sheets

REMOTE BOOKMARKING FOR WIRELESS CLIENT DEVICES

BACKGROUND OF THE INVENTION

1. Field of the Invention

The present invention relates to wireless client devices and, more particularly, to a remote bookmarking for wireless client devices.

2. Description of the Related Art

The explosion of hypertext based technologies has spread to the domain of wireless communication systems. Wireless client devices (e.g., two-way pagers, cellular phones, palm sized computing devices and personal digital assistants (PDAs)) and wireless network protocols have been designed which permit interactive access to remote information services (e.g., directory services, financial information, new services, sport information and traffic & weather reports) through a variety of wireless and wired networks, most notably the World Wide Web (WWW) service of the Internet.

One aspect of this technology that has lagged behind the rest is that of input technology and data entry. The primary method of data entry for most wireless client devices is by a keypad. Due to size constraints and cost considerations, the keypads of these wireless client devices are particularly cumbersome. Keypads usually have between 16 and 24 keys, which is a sufficient number for numeric input but very inefficient when dealing with a standard alphanumeric data set (i.e., ASCII).

A user requesting information from the Internet accesses information servers using a web browser. For example, a user requesting information on stock purchases might input the following string:

http://www.stocktips.net/

Individual web addresses of this type is easily entered in an address box of a web browser used with standard desktop and laptop computers. Such web browsers can, for example, include Netscape Navigator from Netscape Communication Corporation or Microsoft Explorer from Microsoft Corporation. However, most users have a plurality of such sites which are frequently revisited. For the user's convenience, web browsers have also provided a bookmark function that allows a user to save the web addresses of those web sites that the user desires to return to in the future.

Bookmarks for a web browser operate very similar in function to the bookmarks used to hold a place (a page or section of interest) in a book. In the case of the web browser, the bookmark is electronic and the place being held is an electronic document (e.g., a web page) located on an information server and particularly identified by a uniform resource locator (URL). A user bookmarks a web page of interest using a menu selection provided by a user interface of the web browser. For example, Microsoft Explorer has a "favorites" menu that allows a user to provide a bookmark (and a title or label for the bookmark) to the web page currently being viewed by the web browser.

Bookmarks offer two very significant conveniences: 1) Bookmarks free users from having to remember or write down uniform resource locators (URLs) for information sites of interest; and 2) Bookmarks significantly increase information site access speeds by minimizing navigation actions with the user interface. In today's fast paced techno-environment, such conveniences have become very important for service providers and users alike.

Acceptance of wireless client devices with network access (e.g., Internet and intranets) will be significantly improved if users can be presented with a user interface that helps to minimize the limitations (e.g., limited processing/memory capabilities and a cumbersome user interface) of these devices. The use of bookmarks in conjunction with these devices will represent a significant advance in the desired direction.

The existing approaches to use of bookmarks on wireless client devices have various problems. One problem with existing approaches is that several navigation actions are required to select a single bookmark. Each navigation action is time consuming and leads to user dissatisfaction. Another problem associated with using bookmarks in conjunction with wireless client devices is that transmission efficiency when using bookmarks is low because URLs, which can be lengthy, need to be transmitted from the wireless client devices in requests for the bookmarked documents identified by the URLs. Still another problem is that with existing approaches to bookmarks, the URLs for the bookmarks need to be provided on or obtained by and stored in the wireless client device seeking to make use of a bookmark. Although storage of bookmarks and their associated URLs on desktop and laptop computers does not significantly impact the memory resources of desktop and laptop computers, storage of bookmarks and their associated URLs does represent a significant burden on the limited memory resources of wireless client devices. Bandwidth requirements for transmissions over wireless networks is a primary consideration for both service provider and user alike. Some of the URLs can be rather lengthy, requiring considerable bandwidth and airtime.

Thus, there is a need for improved approaches to enable a wireless client device to implement bookmarks with improved transmission efficiency, less navigation actions and/or reduced amounts of memory resources.

SUMMARY OF THE INVENTION

Broadly speaking, the invention relates to improved techniques that enable wireless devices to implement bookmarks with improved transmission efficiency, reduced user navigation and/or reduced amounts of memory resources. One aspect of the invention pertains to use of a compact request from a wireless device to an intermediate server when requesting a document or file by selection of a bookmark. Another aspect of the invention is the ability of a user to select a bookmark to request the associated document or file with reduced user interaction (e.g., a single button action). Still another aspect of the invention is that memory resources of the wireless devices need not be consumed to store network addresses (e.g., URLs) for the bookmarks. These aspects and other aspects described below can be used separately or in combination.

The invention can be implemented in numerous ways, including as a method, an apparatus, a system, and a computer readable medium. Several embodiments of the invention are discussed below.

As a method for requesting a document on a remote server using a user interface of a wireless client device, one embodiment of the invention includes the operations of obtaining a compact bookmark identifier for a selected bookmarked document, and transmitting a compact request including the compact bookmark identifier to a translation server. Neither the compact bookmark identifier nor the compact request include a universal resource locator for the selected bookmarked document.

As a method for utilizing bookmarks on a wireless client device, one embodiment of the invention includes the operations of: selecting one of a plurality of bookmarks available to the wireless client device; transmitting a compact request for the document or file represented by the selected bookmark from the wireless client device to an intermediate server; obtaining, from the intermediate server, a universal resource locator for the document or file represented by the selected bookmark; preparing a non-compact request for the document or file represented by the selected bookmark, the non-compact request including the universal resource locator for the document or file represented by the selected bookmark; and forwarding the non-compact request for the document or file represented by the selected bookmark to a remote server identified by at least a portion of the universal resource locator.

As a method of selecting among a plurality of information servers by a wireless client device having a display and a keypad, one embodiment of the invention includes the operations of: providing a dual function key on the keypad of the wireless client device, the dual function key having a primary function and a secondary function; executing the primary function if the dual function key is pressed for less than a predetermined time period; executing the secondary function if the dual function key is pressed for a time period greater than or equal to the predetermined time period, the execution of the secondary function producing a compact bookmark request; and forwarding the compact bookmark request to an intermediate server device over a wireless network using a first communications protocol. The compact bookmark request is used to access bookmark information available to the intermediate server device to produce a request to one of the plurality of information servers that couple to the intermediate server device through a wired network using a second communications protocol.

As a computer readable medium including computer program code for requesting a page on a remote server using a user interface of a wireless client device, one embodiment of the invention includes: computer program code for obtaining a compact bookmark identifier for a selected bookmarked page; computer program code for producing a compact request for the selected bookmarked page, the compact request including the compact bookmark identifier and not including a universal resource locator for the selected bookmarked page; and computer program code for transmitting a compact request to a translation server.

As a computer readable medium for utilizing bookmarks on a wireless client device, one embodiment of the invention includes: computer program code for selecting one of a plurality of bookmarks available to the wireless client device; computer program code for transmitting a compact request for the document or file represented by the selected bookmark from the wireless client device to an intermediate server; computer program code for obtaining, from the intermediate server, a universal resource locator for the document or file represented by the selected bookmark; computer program code for preparing a non-compact request for the document or file represented by the selected bookmark, the non-compact request including the universal resource locator for the document or file represented by the selected bookmark; and computer program code for forwarding the non-compact request for the document or file represented by the selected bookmark to a remote server identified by at least a portion of the universal resource locator.

As a wireless communication system, one embodiment of the invention includes a plurality of wireless client devices and a server device coupled to a wireless network servicing the wireless client devices. Each of the wireless devices including a keypad, a memory, a screen display and a processor. The processor operates to execute computer program code to generate a compact bookmark when a key on the keypad is depressed and held for a predetermined time period. The server device provides storage for bookmark information for the wireless client devices. The bookmark information is stored associated with user accounts for the wireless communication devices. Upon receiving a compact bookmark from one of the wireless communication devices, the server produces a request to a remote server storing a document or file associated with the compact bookmark, where the request is formed based on the compact bookmark and bookmark information.

The advantages of the invention are numerous. Different embodiments or implementations may yield one or more of the following advantages. One advantage of the invention is that bookmarks are able to be selected with greater speed and ease. Another advantage of the invention is that between the wireless client device and an intermediate server (e.g., proxy server) a compact request format is used so as to substantially reduce the amount of data to be transmitted for a request. Still another advantage of the invention is that memory storage at the wireless client device to support bookmarks is reduced.

Other aspects and advantages of the invention will become apparent from the following detailed description taken in conjunction with the accompanying drawings which illustrate, by way of example, the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

In the following detailed description of the present invention, numerous specific details are set forth in order to provide a thorough understanding of the present invention.

However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are often presented in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art.

The invention relates to improved techniques that enable wireless devices to implement bookmarks with improved transmission efficiency, reduced user navigation and/or reduced amounts of memory resources. One aspect of the invention pertains to use of a compact request from a wireless device to an intermediate server when requesting a document or file by selection of a bookmark. Another aspect of the invention is the ability of a user to select a bookmark to request the associated document or file with reduced user interaction (e.g., a single button action). Still another aspect of the invention is that memory resources of the wireless devices need not be consumed to store network addresses (e.g., URLs) for the bookmarks. These aspects and other aspects described below can be used separately or in combination.

Wireless client devices, also referred to as two-way interactive communication or mobile devices, include but are not limited to personal digital assistant (PDA) like devices, cellular phones, or wireless capable remote controllers. Such devices typically have significantly less memory and processing capability than is found in desktop and laptop computers. These wireless client devices, which are not a combination of a computer and a wireless communications module, have a small display screen and a limited keypad as opposed to the keyboards associated with desktop computers.

Figure 1:
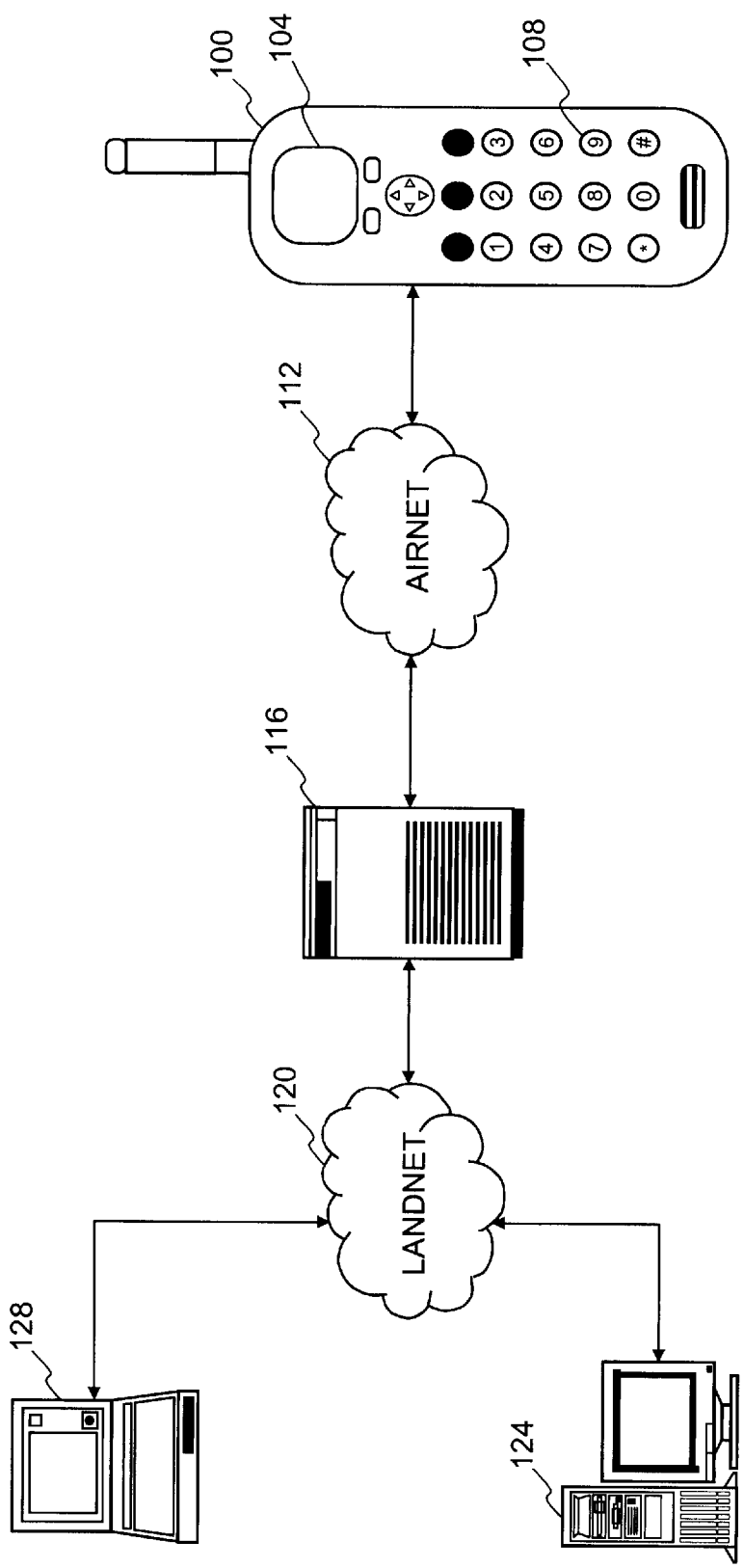
FIG. 1 illustrates a schematic configuration in which the present invention may be practiced.

FIG. 1 is a block diagram of an information retrieval system according to one embodiment of the invention. The information retrieval system allows a plurality of two-way wireless interactive communication devices 100 to information from remote information servers. The plurality of two-way wireless interactive communication devices 100, referred to as wireless client devices or mobile devices herein, are serviced by airnet 112. Although only one two-way wireless interactive communication devices 100 is shown in the FIG. 1, the information retrieval system supports many two-way wireless interactive communication devices 100. More generally, the airnet 112 is a wireless network and can be implemented in a variety of types of wireless networks. Examples of commonly used wireless networks include Cellular Digital Packet Data (CDPD), Global System for Mobile Communications (GSM), Code Division Multiple Access (CDMA) and Time Division Multiple Access (TDMA), to name a few.

Also shown in FIG. 1 is landnet 120, which is a landline network. More generally, landnet 120 is a wired network. For example, landnet 120 may be the Internet, an intranet or other data network. Coupled to landnet 120 are a personal computer (PC) 128 and an information server device 124. Personal computer 128 may be a commonly available laptop or desktop computer and run a HyperText Markup Language (HTML) browser, such as Netscape Navigator from Netscape Communications Corporation (www.netscape.com). The HTML browser can communicate with the information server device 124 via landnet 120 using HyperText Transfer Protocol (HTTP) to thus access information stored in the information server device 124. As an example, the information server device 124 is a workstation computer such as available from SUN Microsystems Inc. (www.sun.com). The information stored in the information server device 124 may be hypermedia information. Although not shown, various other servers or computers are connected to landnet 120.

A proxy server device 116 is coupled between landnet 120 and airnet 112. The proxy server device 116 is also known as a network gateway server. The proxy server device 116 can be implemented as a workstation computer or a personal computer. Often, the communication protocol used in airnet 112 is different from that used in landnet 120. As a result, one of the functions that proxy server device 116 performs is to map or translate from one communication protocol to another, thereby wireless device 100 coupled to airnet 112 can communicate with any of the information server devices (e.g. information server 124) coupled to landnet 120 via proxy server device 116. The proxy server device 116 also store or provide access to accounting services, configuration management services, and dedicated storage for applications and files for user accounts. These applications and services may be resident on proxy server device 116 or on a separate server device accessible via landnet 120.

According to one embodiment, the communication protocol used by information server device 124 is the well known HyperText Transfer Protocol (HTTP) or its secure version (HTTPS). HTTP operates on Transmission Control Protocol (TCP) and controls the interaction of personal computer 128 and information server 124 with landnet 120. In such an embodiment, information server 124 operates as a HTTP server and personal computer 128 operates a HTML browser.

The communication protocol between wireless client device 100 and proxy server device 116 via airnet 112 is, for example, Handheld Device Transport Protocol (HDTP) (formerly known as Secure Uplink Gateway Protocol (SUGP)) or Wireless Access Protocol (WAP). HDTP and WAP can run on User Datagram Protocol (UDP). In such an embodiment, the interaction between proxy server device 116 and wireless client device 100 uses HDTP over UDP. The wireless client device 100 operates a Handheld Device Markup Language (HDML) browser (also known as a micro-browser).

It should be noted that HDTP is a session-level protocol that resembles HTTP but without incurring the overhead thereof and is highly optimized for use in thin devices, such as mobile devices that have significantly less computing power and memory than a desktop personal computer. Further, it is understood to those skilled in the art that UDP does not require a connection to be established between a client and a server before information can be exchanged, which eliminates the need of exchanging a large number of packets during a session creation between a client and a server. Exchanging a very small number of packets during a transaction is a desired feature for a mobile device with very limited computing power and memory to effectively interact with a landline device.

HDML is a tag based document language and comprises a set of commands or statements specified in a card that specifies how information displayed on a small screen 104 of the wireless client device 100. Normally, a number of cards are grouped into a deck that is a unit of HDML information exchanged between wireless client device 100 and proxy server device 116. The specifications of HDTP, entitled "HDTP Specification" and HDML, entitled "HDML 2.0 Language Reference" are incorporated herein by reference in their entirety.

The communication protocols (HDTP, HTTP, and HTTPs) and the markup languages (HDML and HTML) are presented for purposes of illustration and not limitation. One skilled in the art will appreciate that the present invention can be practiced using other communications protocols (e.g., Wireless Session Protocol (WSP)) and markup languages (e.g., Compact Hypertext Markup Language (cHTML) and Wireless Markup Language (WML).

Some of the features in wireless client device 100 that make the disclosed system work more efficiently are described below. According to one embodiment, wireless client device 100 includes a display screen 104 and a phone keypad 108 which allow a user thereof to interact with wireless client device 100. Phone keypad 108 preferably provides a typical phone keypad, a pair of generic buttons, and at least a pair navigation buttons. The typical phone keypad, as commonly seen, has twelve buttons. Of the twelve buttons, ten buttons are consecutively numbered (0 to 9), one button is designated "*", and the other button is designated "#". Further, it is to be understood by those of ordinary skill in the art that the present invention may be practiced using various other types of input interfaces and arrangements (e.g., softkeys, iconic screens).

Further, there is a working memory (not shown) in wireless client device 100. Compiled and linked processes are typically stored in the working memory as a client module that causes wireless client device 100 to interact with a remote server, such as proxy server device 116. Upon activation of a predetermined key utilizing keypad 108, for example, wireless client device 100 initiates a communication session with proxy server device 116 using the client module in the working memory. During the communication session, the wireless client device 100 requests certain information (e.g., a document) from information server 124 or proxy server device 116. In one embodiment, in response to the request, wireless client device 100 typically receives a single HDML deck (from or through proxy server device 116 and stores (caches) the deck in the working memory. As described above, an HDML deck comprises one or more cards and each card includes the information required to generate a screen display on display screen 104. The number of cards in a card deck can be selected to facilitate efficient use of the resources in wireless client device 100 and in airnet network 112.

As used herein, a display screen is the physical display apparatus in a wireless client device, such as a 4-line by 20-character Liquid Crystal Display (LCD) screen. A screen display is an image presented or displayed on the display screen. Further, it is understood that a display screen having display lines is only for illustrative purpose and many display screens in reality are graphics-based and do not necessarily have distinct display lines and it will be appreciated that the principles of this invention are equally applicable thereto.

Although the information retrieval system illustrated in FIG. 1 includes the proxy server device 116, it should be understood that the information retrieval system does not require that a proxy server device be present. Instead, the airnet 112 could couple the landnet 120 directly which would allow the wireless client device 100 to access information servers, such as the information server 124.

According to one embodiment of the invention, wireless client device 100 and proxy server device 116 together provide bookmark features to the information retrieval system. A user of the wireless client device is able to utilize the bookmark features to gain rapid and easy access to previously bookmarked locations (e.g., remote information servers) or documents thereon. A bookmark is a shortcut feature that allows a user to access a remote location or document identified by a uniform resource locator (URL) without having to type in the URL. Hence, by selecting a bookmark, the user directs the wireless client device 100 to the remote location or document without having to perform the tedious data entry for the URL. According to the invention, the bookmarks for wireless client device 100 are stored in proxy server device 116 (or some other remote server coupled to landnet) and not normally stored in wireless client device 100. As a result, the limited memory available on wireless client device is not consumed by storage of bookmarks and greater numbers of bookmarks can be supported. Since proxy server device 116 supports a large number of subscribers or wireless client devices, the bookmarks for each subscriber or wireless client device are stored separately along with other information (e.g., account, configuration, and preference information).

Bookmarks for a subscriber or wireless client device 100 can be entered using personal computer 128 or wireless client device 100. For example, personal computer 128 can access to proxy server device 116 through the landnet using, for example, a web browser to edit, create and delete bookmarks for the wireless client device 100. Alternatively, a user of the wireless client device 100 can interact with the keypad 108 and other buttons or input areas to edit, create and delete bookmarks for the wireless client device 100. When a bookmark is created it can also be provided with a shortened name that can be displayed on display screen 104 as needed or requested to remind the user of the previously assigned bookmarks.

According to one embodiment of the invention, the bookmarks are assigned to particular keys on keypad 108 of wireless client device 100. A user wishing to access information server 124 (e.g., a document or file on information server 124) from wireless client device 100 using a previously defined bookmark need only press and hold the assigned key. Pressing and holding the assigned key causes wireless client device 100 to generate a compact bookmark identifier which is transmitted to proxy server device 116 in a compact request for the bookmarked document (or file). The proxy server device 116 will intercept the compact request from the wireless client device 116 and convert the compact request into a normal request. Namely, the compact request using the compact bookmark identifier, whereas the normal request uses the appropriate URL previously associated with the bookmark. The appropriate URL is stored at proxy server device 116 (or accessible thereto) and is associated with a device identifier associated with wireless client device 100 or a subscriber identifier associated with the subscriber.

Figure 2:
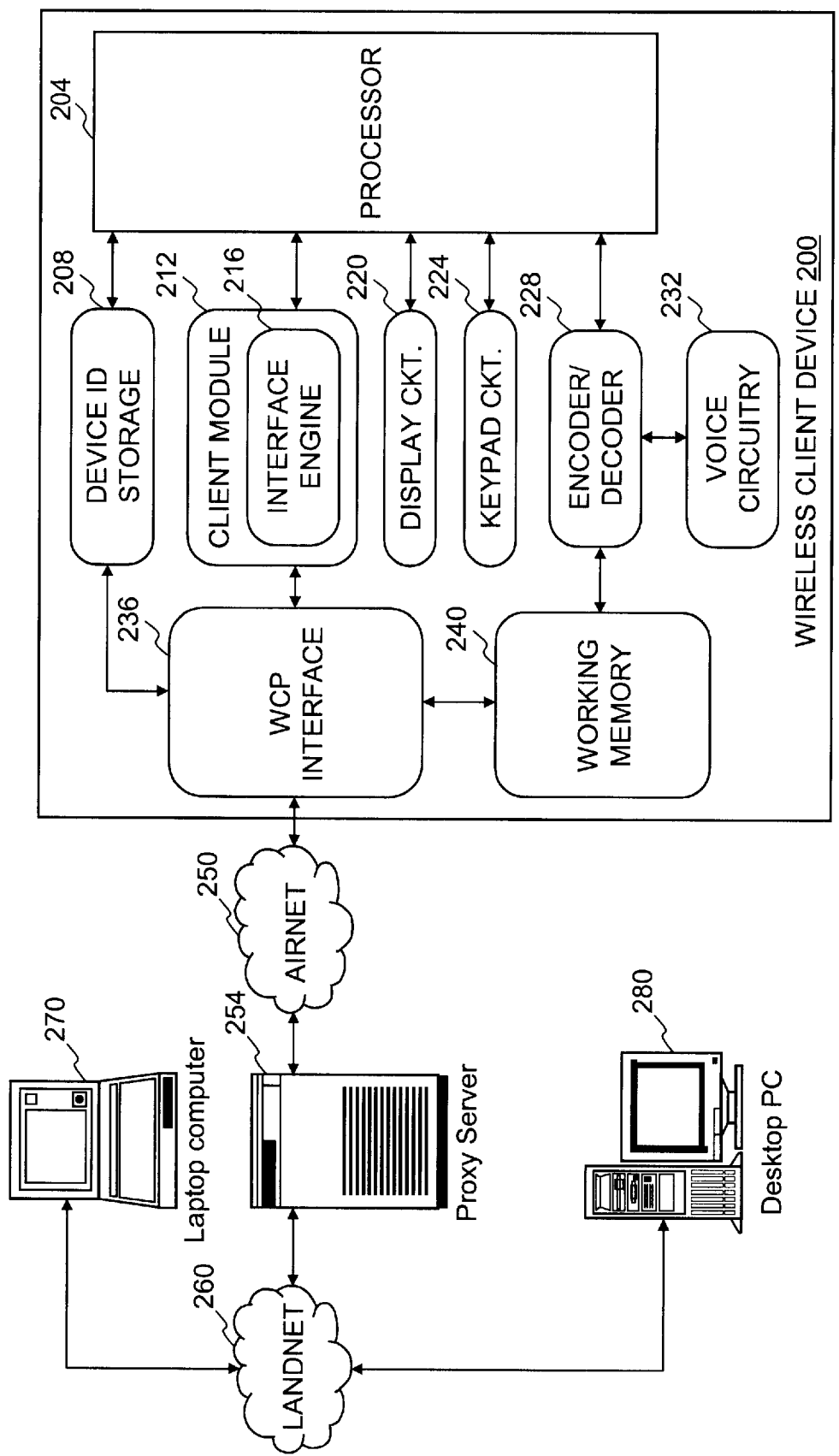
FIG. 2 illustrates a functional block diagram of a wireless client device according to an embodiment of the present invention.

FIG. 2 is a block diagram of an information retrieval system according to another embodiment of the invention. The information retrieval system includes wireless client device 200, personal computer 270, proxy server device 254, and information server 280. Proxy server device 254, information server 280 and personal computer 270 respectively correspond to proxy server device 116, information server 124, and personal computer 128 of FIG. 1. The wireless client device 200 is, for example, a detailed embodiment of wireless client device 100. To avoid obscuring the principle aspects of the present invention, well known methods, procedures, components and circuitry in wireless client device 200 are not described in detail.

Wireless client device 200 includes a Wireless Control Protocol (WCP) interface 236 that couples to airnet 250 via a RF transceiver (not shown) to receive incoming and outgoing data signals. Device identifier (ID) storage 208 supplies a device ID to WCP interface 236. The device ID identifies a specific code that is associated with wireless client device 200 and directly corresponds to the device ID in a subscriber (user) account provided in proxy server device 254. In addition, wireless client device 200 includes a client module 212 with an interface engine 216 which works in conjunction with processor 204 and working memory 240 to perform the processing tasks performed by wireless client device 200 including establishing a communication session with proxy server device 254 via airnet 250, requesting and receiving data via airnet 250, displaying information on a display screen through the use of display circuitry 220, and receiving user input from a user via a keypad controlled by keypad circuit 224. Additionally, the client module 212 operates, among other things, a browser, commonly referred to as micro-browser, requiring much less computing power and memory than well-known HTML browsers do. The micro-browser is, for example, a HDML micro-browser available from Unwired Planet, Inc. located at 800 Chesapeake Drive, Redwood City, Calif. 94063. Additional details on accessing a (proxy) server device from a wireless client device using a (micro) browser is described in U.S. patent application Ser. No. 08/570,210, now U.S. Pat. No. 5,809,415, which is hereby incorporated by reference in its entirety.

Wireless client device 200 also includes the voice circuitry 232 (e.g., a speaker and a microphone) and the associated hardware (e.g., encoder/decoder 228, processor 204 and keypad circuitry 224) which allows it to switch to a telephone mode of operation which is separate and distinct from a network (data) mode of operation used when interfacing with proxy server device 254 and other devices on landnet 260.

According to one embodiment of the present invention, a user desiring to obtain information from information server 280, places wireless client device 200 in the network mode of operation and presses and holds a pre-assigned key on the keypad of wireless client device 200. The software stored in client module 212 causes the key that was pressed and held to be recognized in a unique manner than that same key would be recognized in the telephone mode of operation. Specifically, instead of generating a alphanumeric character (e.g. "1"), a compact bookmark identifier is generated. Wireless client device 200 establishes a connection with proxy server device 254 via airnet 250 and transmits a compact request for the document identified by the compact bookmark identifier. The compact bookmark identifier is used to access previously stored bookmark information on proxy server device 254. Using the stored bookmark information, proxy server device 254 generates a normal request for the document originally identified by the compact bookmark identifier. The normal request is then forwarded over landnet 260 to information server 280 (where the requested documents resides). One of ordinary skill in the art will appreciate that if wireless client device 200 is in a non-network mode (e.g., telephone mode) of operation then software within wireless client device 200 can cause wireless client device 200 to be placed in the network mode of operation upon detecting that a pre-assigned key has been press and held so as to select a previously assigned bookmark.

In the case where wireless client device 200 uses HDML or WML protocols, various operations on wireless client device are controlled or provided through card decks. Card decks contain one or more cards of HDML or WML documents. For example, an interface card deck can be provided on wireless client device 200 to facilitate a user creating, modifying or deleting bookmarks. According to one embodiment, the bookmarks are assigned to the keys associated with the keypad on wireless client device 200. It is important to note that any key on the keypad of wireless client device 200 can be assigned as a bookmark. When bookmarks are created, modified or deleted using wireless client device 200, an interface card deck can control the user interface provided to the user via the display screen. As noted above, the bookmarks can also be created, modified or deleted through use of personal computer 270.

More particularly, when needed, an interface card deck is received by wireless client device 200 and is loaded into working memory 240. The interface card deck is then processed by processor 204 and client module 212 to produce a user interface on the screen display. The interface card deck is comprised of one or more markup language entities, which contribute to the functionality of the user interface on wireless client device 200. The functions provided include: 1) information display; 2) list selection; 3) input operations; and 4) control functions. These functions will enable the user interface of the wireless client device 200 to function more efficiently during bookmark creation, modification, and deletion. The interface card deck is navigated using the previously described microbrowser. For example, the interface card deck can be used to prompt the user for input (e.g., "Address for the Site is?", "Name for the Site?", "Press the Key You Want to Assign").

Additionally, it will be appreciated by one of ordinary skill in the art that this method of bookmark assignment and utilization may be practiced using user interfaces other than keypads (e.g., iconic interfaces, generic buttons, special buttons, soft buttons). Further, although the selection of a previously established bookmark is achieved through a press and hold of a pre-assigned key, the selection of a bookmark can be achieved in other ways, including a double-click of a button, a short sequence of buttons, etc.

It should also be noted that an interface card deck can also display a list of bookmarks that have already been assigned. As an example, the list of bookmarks that have already been assigned can be provided to and displayed by the wireless client device by pressing and holding a predetermined key (e.g., "0") on the keypad. A user could then navigate through the list to select a bookmark from the list. This type of selection, however, does not offer the advantages of minimal user actions to obtain a selection as does the simple selection of a pre-assigned button.

Figure 3:
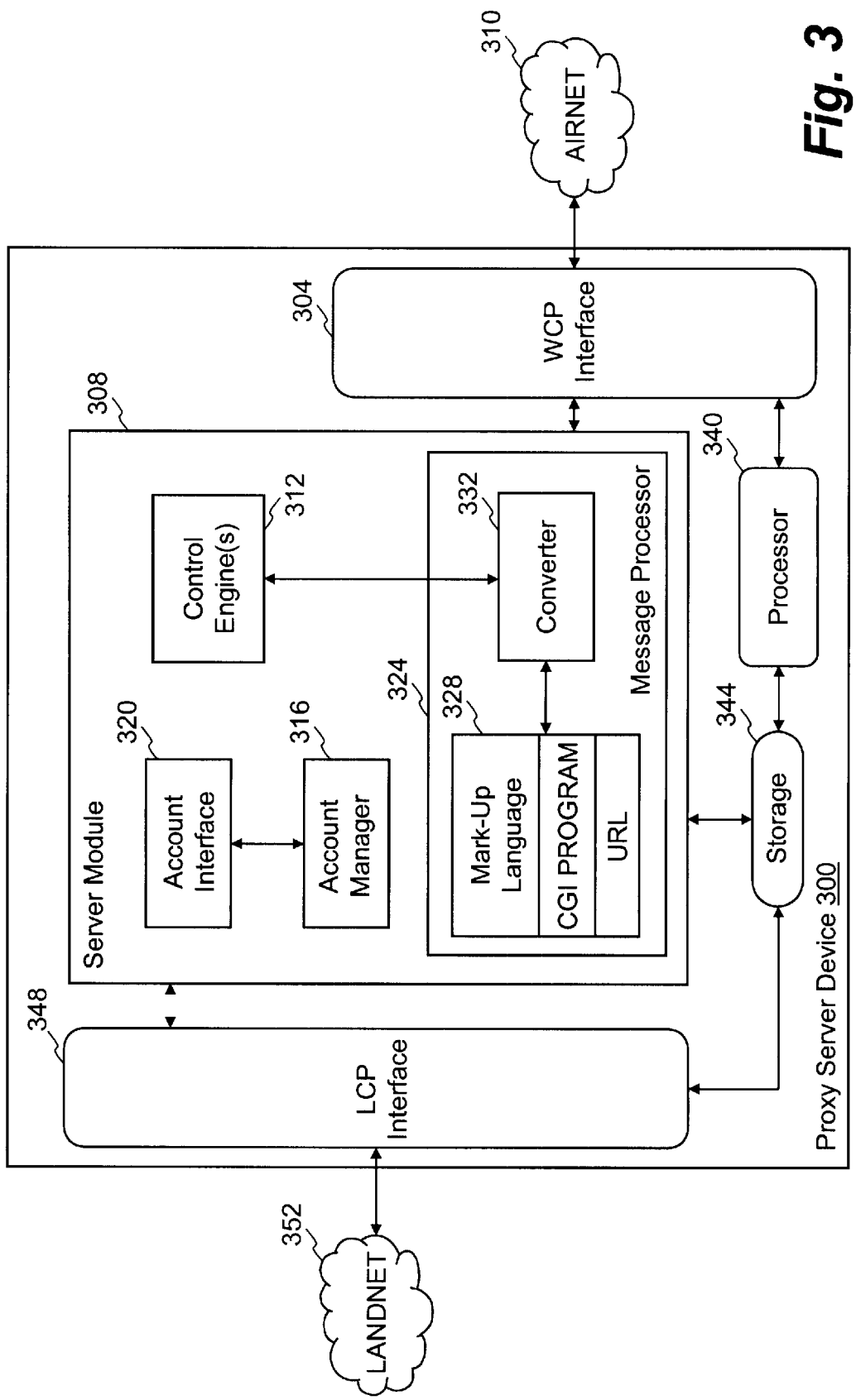
FIG. 3 illustrates a functional block diagram of a proxy server device according to an embodiment of the present invention.

FIG. 3 is a detailed block diagram of a proxy server device 300 according to one embodiment of the invention. Proxy server device 300 comprises a server module 308 coupled between LCP interface 348 and WCP interface 304. Server module 308, which is typically loaded in memory, performs traditional server processing as well as protocol conversion processing from one communication protocol to another communication protocol. More particularly, server module 308 is coupled to a landnet 352, which uses a first communication protocol (e.g., Hypertext Transfer protocol (HTTP) or Secure Hypertext Transfer Protocol (HTTPS)), and to an airnet 310 which uses a second communication protocol (e.g., Handheld Device Transport Protocol (HDTP) or Wireless Access Protocol (WAP)).

It is understood to those skilled in the art that a server device used herein, which may perform as proxy server device 254 and be coupled to landnet 260, refers to a piece of hardware equipment that comprises one or more microprocessors, working memory, buses and necessary interfaces and other components. One the other hand a server module refers to compiled and linked processes of the disclosed system loaded into the working memory to perform designated functions through the parts and components in the server device.

Server module 308 comprises a control engine 312, a message processor 324, an account manager 316, and an account interface 320. Control engine 312 interacts with the client module of wireless client device (not shown) through airnet 310 and coordinates the reception of requests. Message processor 324 receives messages from landnet 352 and performs a series of processing and management activities. The processing performed by message processor 324 includes protocol conversion between the different protocols used on airnet 310 and landnet 352.

Account manager 316 manages through account interface 320 a number of subscriber (user) accounts for all the wireless client devices serviced by proxy server device 300. Each of the wireless client devices serviced by proxy server device 300 is assigned a device identifier (ID). Device ID can be a phone number of the device or an IP address or a combination of an IP address and a port number, for example: 204.163.165.132:01905 where 204.163.165.132 is the IP address and 01905 is the port number. The device ID is further associated with a subscriber ID created and administrated by a carrier and stored in proxy server device 300 as part of the procedures to activate a subscriber account for a wireless client device. The subscriber ID may take the form of, for example, 861234567-10900_pn.mobile.att.net by AT&T Wireless Service, and is a unique identification to a wireless client device.

Upon receiving a compact request having a compact bookmark identifier for a previously assigned bookmark, proxy server device 300 accesses the subscriber account (corresponding to the subscriber identification number of the wireless client device that sent the compact bookmark identifier) contained within proxy server device 300 or in a remote server accessed via landnet 352. The subscriber account contains bookmark information that has been previously stored. The bookmark information includes a Uniform Resource Locator (URL) for the selected bookmark being identified by the compact bookmark identifier. The bookmark information can also include a short name for the bookmark. Proxy server device 300 can also forward a wireless client device a interface card deck for a menu list of previously assigned keys that can be displayed on the display screen of the requesting wireless client device so that a user can determine which keys are assigned to which bookmarks. In such case, the short names serve to inform the user of the location or document of the bookmark. One example of a short name is "Acme" for the full name "Acme Corporation—Home Page". Such short names are more likely able to fit on the limited size screen display and more likely to be more descriptive of the bookmark.

Figure 4:
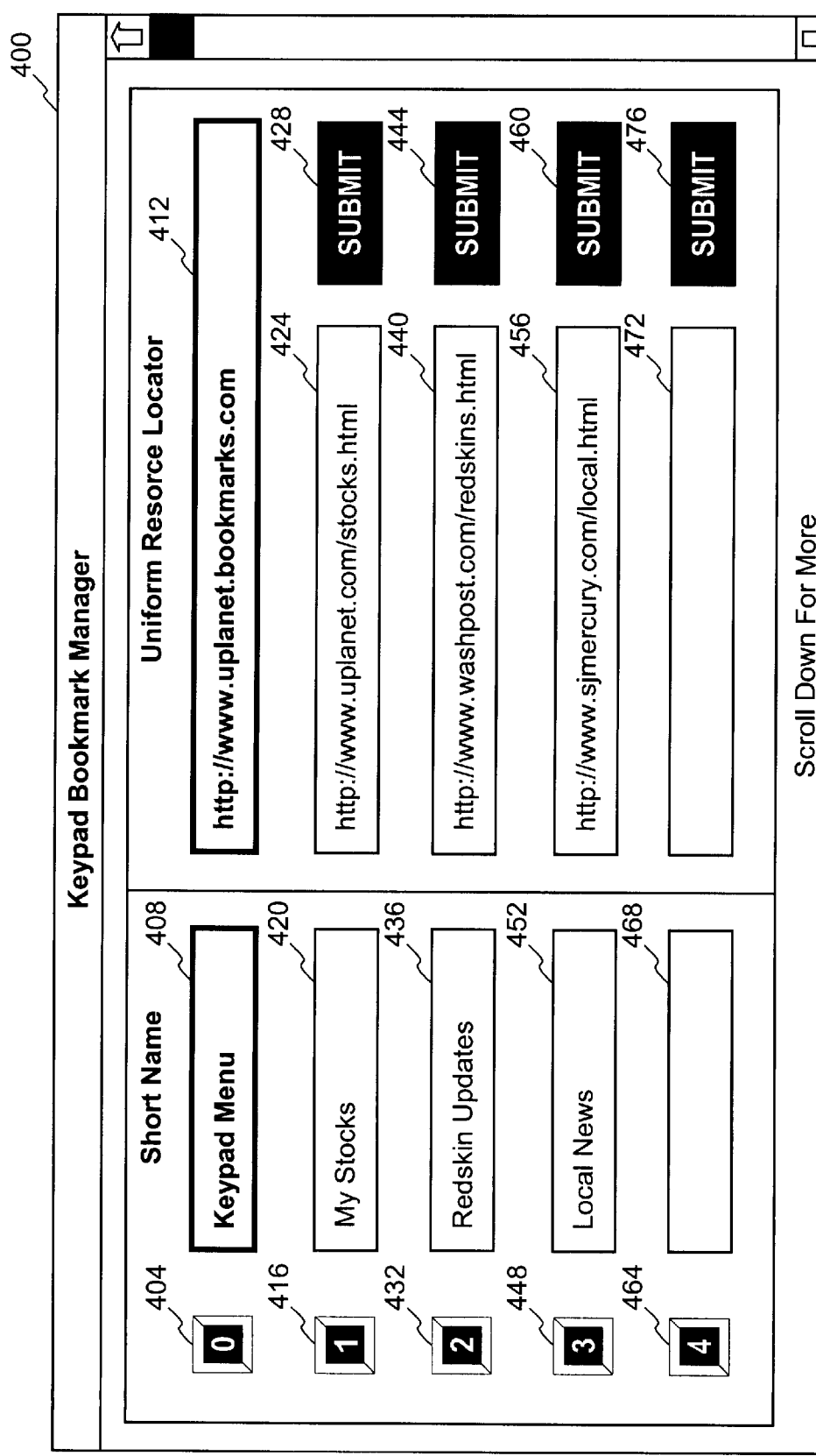
FIG. 4 illustrates a "Keypad Bookmark Manager" used to assign the bookmarks to the keys of the wireless client device according to one embodiment of the present invention.

FIG. 4 is an exemplary screen shot 400 for a Keypad Bookmark Manager according to one embodiment of the invention. A user wishing to create, modify or delete bookmarks for a wireless client device (e.g., wireless client device 100 of FIG. 1) can access Keypad Bookmark Manager using a computer (e.g., computer 128 of FIG. 1) with network connectivity (e.g., the Internet) and a web browser (e.g., Netscape Navigator). Each user or subscriber to wireless network service can be given a personal home page which they can visit to access Keyboard Bookmark Manager.

In the screen shot 400 for Keypad Bookmark Manager an iconic symbol 404 representing a "0" key shows that this key has been previously assigned to a location (e.g., document or web page address) having a specific URL 412. The specific URL in this example is: http://www.uplanet.bookmarks.smethers.com. The short name for the bookmark assigned to the "0" key is "Keypad Menu" as shown in field 408. In this example, the fields in 408 and 412 are pre-set and are not normally able to be modified. The other fields displayed in the screen shot 400 of Keypad Bookmark Manager may be assigned by the user. The screen shot 400 shows that bookmarks for keys "1", "2" and "3" have been assigned by the user, and that key "4" is as yet unassigned. With respect to key "1", the screen shot 400 show that the bookmark has a short name of "My Stocks" in field 420 and a URL of "http://www.uplanet.com/stocks.html/" in filed 424. Keys "2" and "3" are also shown in the screen shot 400 has having been assigned in accordance with information in fields 436, 440, 452 and 456. When a user first enters a bookmark or modifies a bookmark, the entry is registered by activating the "SUBMIT" button associated with the assigned key (see iconic buttons 428, 444, 460 and 476). For example, upon entering a bookmark assignment for the "2" key "SUBMIT" button 444 would be pressed. Fields 468 and 472 for the "4" key are current unassigned and available to store the user's next bookmark. Although only numbered keys have been described in this example, it would be apparent to one of ordinary skill in the art that any key on the keypad or other button or input selection mechanism of the subject wireless client device may be similarly assigned.

Figure 5:
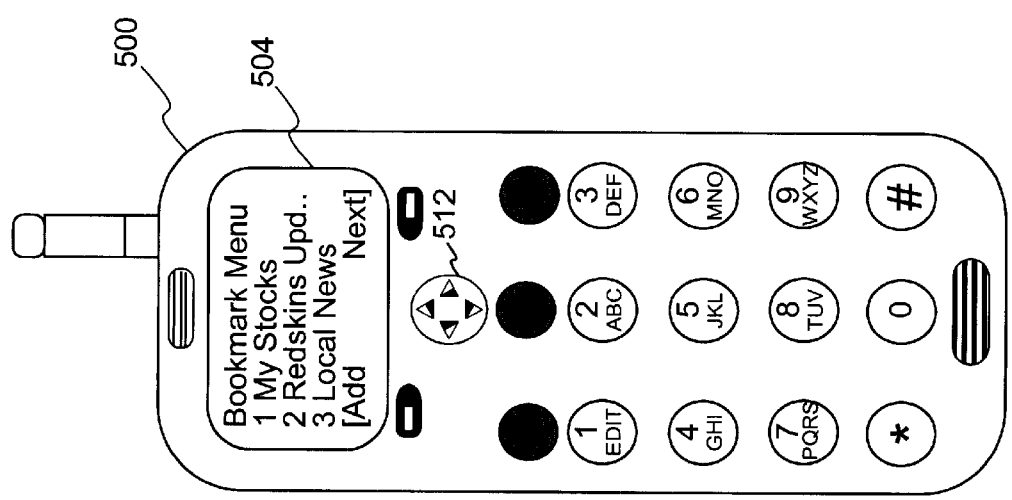
FIG. 5 illustrates the user interface and display of a wireless client device according to one embodiment of the present invention.

FIG. 5 is an exemplary wireless client device 500 for use with the invention. Once the bookmarks for wireless client device 500 have been assigned, pressing and holding an assigned key while the device is in the network (data) mode of operation will cause a compact request including the compact bookmark identifier to be obtained and forwarded to the associated proxy server device. For example, pressing and holding the "0" key will cause the compact bookmark identifier for that key to be generated and forwarded to the proxy server device in a compact request. The compact bookmark identifier is preferably two bytes in size. For example, the compact bookmark identifier can be two characters, a control character indicating a bookmark and a number for the particular bookmark. In the case of the "0" key and the assignments shown in FIG. 4, the proxy server device retrieves the bookmark associated with the "0" key (i.e., http://www.uplanet.bookmarks.com/smethers.html and forwards a request for the page identified by the retrieved URL. The information server containing that document responds to the request and forwards the requested document or file to the wireless client device. In this example, the retrieved URL happens to address a HDML file residing on the proxy server device. This HDML file contains a listing the assigned keys to bookmarks and the associated short names that can be displayed on the screen display. Often, however, the URLs address documents or files on an information server located anywhere on the landnet. The wireless client device thereafter receives the requested document or file and displays information on the display screen 504.

Figure 6:
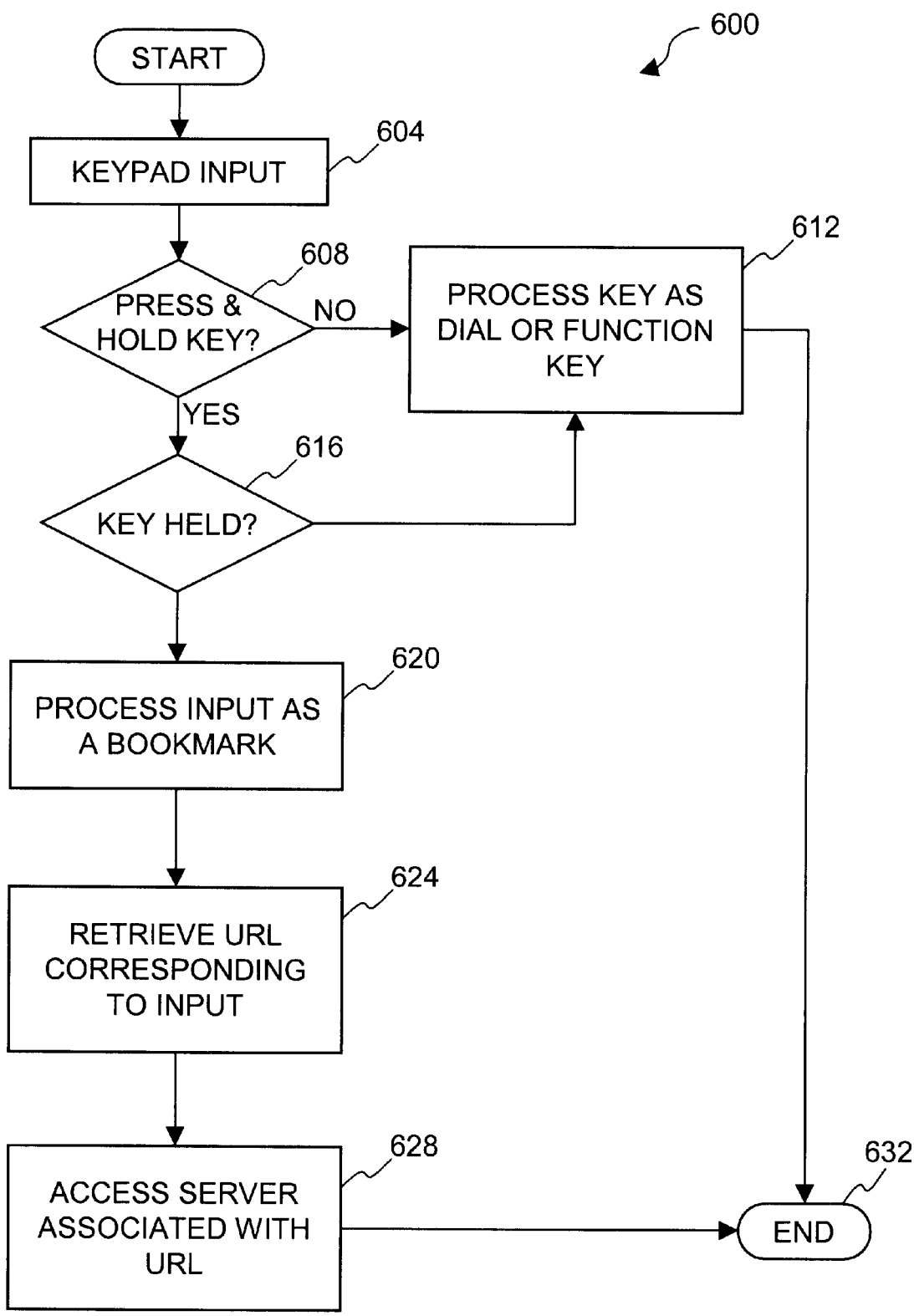
FIG. 6 is a flowchart of the bookmark processing according to one embodiment.

FIGS. 6 is a flowchart illustrating bookmark selection and processing 600 according to one embodiment of the present invention. The processing 600 begins at block 604 where a key press on a keypad is received. At block 608, a determination is made as to whether or not the pressed key is a press and hold key. Here, in this embodiment, press and hold keys are those keys that are eligible for press and hold entries. The press and hold are those keys that are eligible to be assigned to a bookmark. If the pressed key is not a press and hold key, then the pressed key will be processed as a normal input from an alpha-numeric numeric or function key at block 612. On the other hand, if the pressed key is a press and hold key, then a determination is made as to whether the press key has also been held at block 616. If the pressed key is determined not to have been held, then the processing 600 also performs block 612. If, on the other hand, the pressed key was held, then the pressed key is processed as a bookmark at block 620. In one embodiment, the pressed key is determined to be held is the key was pressed and held for a predetermined time period (e.g., 2 seconds). Hence, if the pressed key was pressed and released before the predetermined time period had expired, the pressed key is processed as a normal input from a alphanumeric or function key at block 612. At block 620, a bookmark request and a compact bookmark identifier will be generated and forwarded to the proxy server device storing the user's bookmark information. The proxy server device will use the compact bookmark identifier to retrieve the associated URL with the bookmark at block 624. Then, a request will be generated and forwarded by the proxy server device to the information server identified by the URL at block 628. Following block 628, as well as following block 612, the processing 600 is complete and ends.

Figure 7:
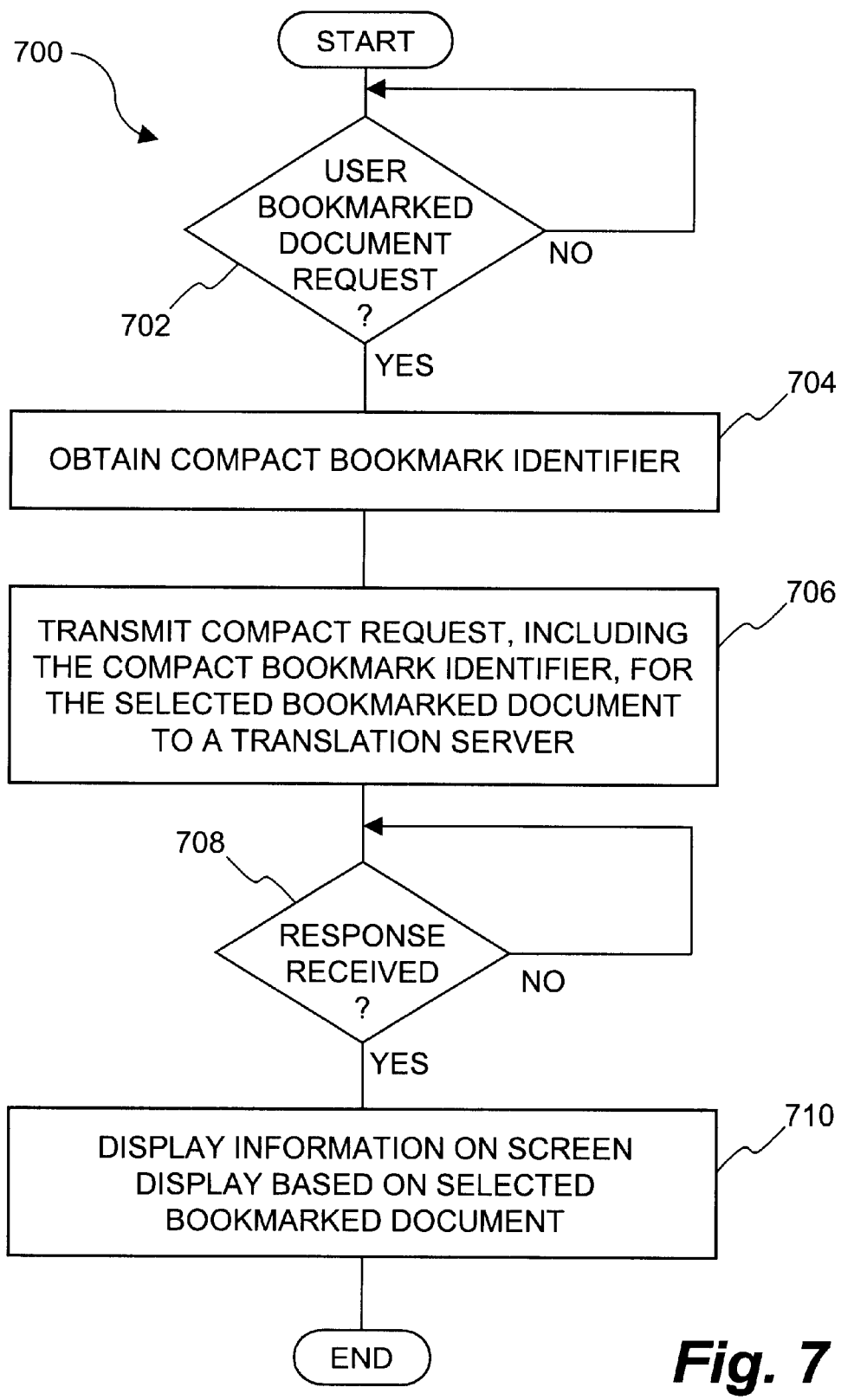
FIG. 7 is a flow diagram of client-side request processing according to one embodiment of the invention.

FIG. 7 is a flow diagram of client-side request processing 700 according to one embodiment of the invention. The client-side request processing 700 is, for example, performed by the client module 212 of the wireless client device 200 illustrated in FIG. 2.

The client-side request processing 700 begins with a decision block 702 that determines whether the user has requested a bookmarked document. Here, the client-side request processing 700 is essentially initiated when a user interacts with the wireless client device to select a bookmarked document that is to be requested. A user can request a bookmarked document in a variety of ways. In one embodiment, a bookmarked document is requested by the press and hold of a pre-assigned key of the wireless client device.

Once the decision block 702 has determined that the user has requested a bookmarked document, a compact bookmark identifier is obtained at block 704. The compact bookmark identifier is a short identifier of at most a few bytes that identifies the particular bookmark that has been selected by the user. For example, for the wireless client device 500 illustrated in FIG. 5, the telephone keypad 516 includes at least twelve buttons, namely buttons labeled 0–9, * and #. Each one of these at least twelve buttons can operate as a bookmark. As an example, when the user depresses button labeled "1", a first bookmark is selected and the compact bookmark identifier can be "&1". For such a compact bookmark identifier, only two bytes are need to identify the bookmark, a single bite for a bookmark control signal ("&") and another byte for a numeric value of the bookmark identifier ("1").

Next, a compact request is transmitted to a translation server. The compact request is a request for the bookmarked document that is sent to the translation server. However, the compact request is constructed such that to identify the bookmarked document, the compact bookmark identifier is contained within the compact request. The compact request will also, among other things, contain a device identifier (ID), a destination address and a source address.

At this point, the wireless client device is awaiting a response from the translation server. Hence, at block 708, a decision block determines whether a response has been received. Once a response has been received, the response includes the selected bookmarked document that was previously requested. Hence, at block 710, the selected bookmarked document causes information to be displayed on a screen display of the wireless client device. Following block 710, the client-side request processing 700 is complete and ends.

Figure 8:
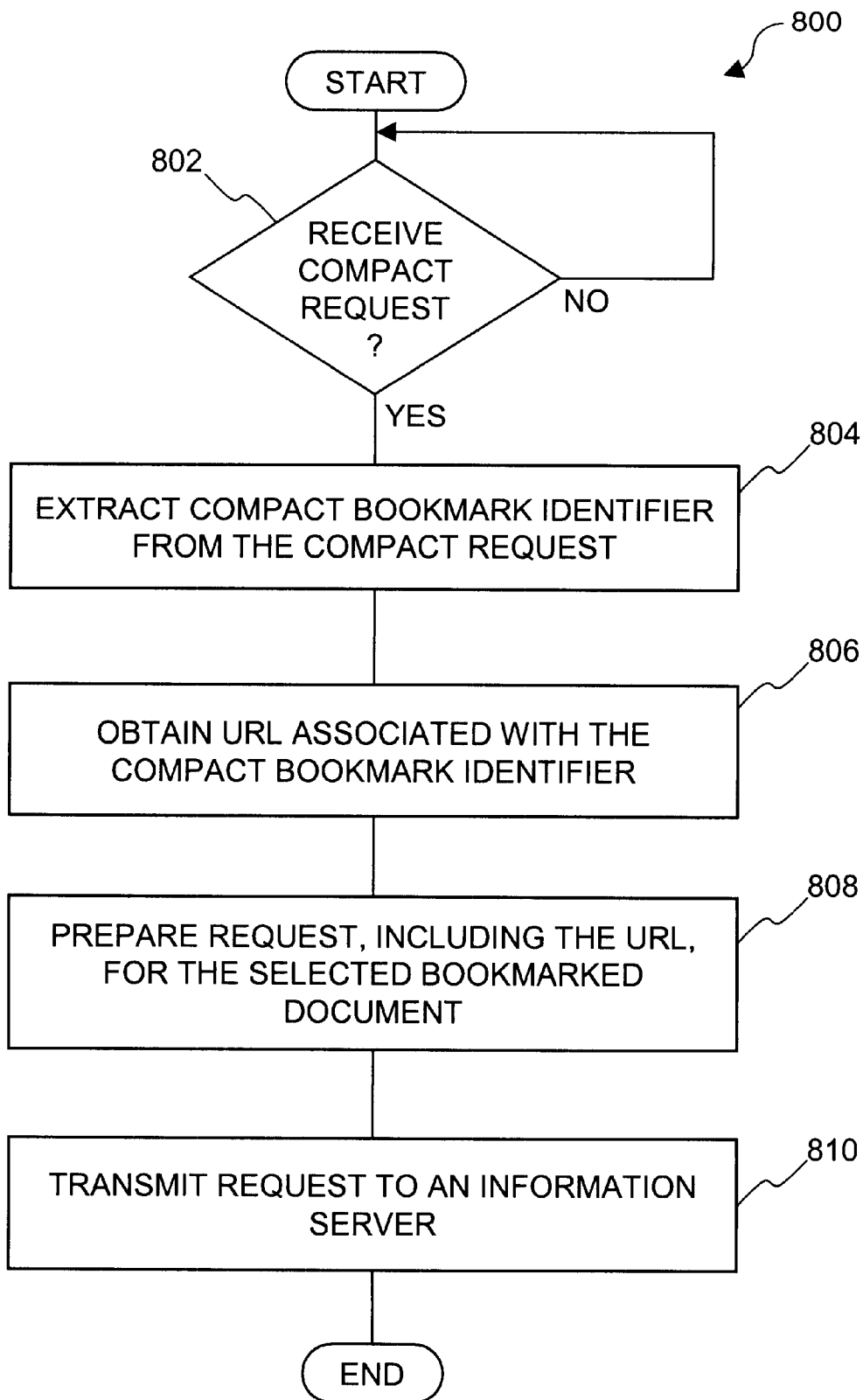
FIG. 8 is a flow diagram of intermediate request processing according to one embodiment of the invention.

FIG. 8 is a flow diagram of intermediate request processing 800 according to one embodiment of the invention. The intermediate request processing 800 is, for example, performed by the proxy server device 116 illustrated in FIG. 1. Alternatively, the intermediate request processing can be performed by any other remote server coupled to the landnet (including the translation server of FIG. 7).

The intermediate request processing 800 begins with a decision block 802 that determines whether a compact request has been received from a wireless client device. In other words, the intermediate request processing 800 is activated or begins when a compact request has been received from the wireless client device through the airnet. The compact nature of the compact request means that its size in terms of number of bytes is limited so that minimal bandwidth is consumed or needed and rapid transmission through the airnet 112 can be obtained. Once the decision block 802 determines that a compact request has been received, the compact bookmark identifier is extracted from the compact request at block 804. The compact bookmark identifier is embedded within the compact request, typically as a field within the compact request. Hence, block 804 operates to parse the compact request to obtain the compact bookmark identifier.

Next, a URL associated with the compact bookmark identifier is obtained at block 806. Here, for example, the remote server (translation server) stores a table for each subscriber supported by the airnet system. These tables store the URLs as associated with the subscriber's bookmarks as utilized on their wireless client devices. Upon receiving the compact request, a device identifier is obtained from the incoming compact request and used to obtain a subscriber ID which, in turn, identifies the table associated with the subscriber. Then, the compact bookmark identifier can be used to look-up within the table the appropriate URL (address) for the requested bookmarked document. Then, a standard request (i.e., no longer compact in nature) is prepared for the selected bookmarked document at block 808. The standard request will, among other things, contain the obtained URL, the device identifier (ID), the destination address and the source address. Here, the remote server operates to form a traditional request using the URL that has been obtained from the table associated with the subscriber.

After the request is prepared, the request is transmitted to an information server at block 810. However, in the case in which the intermediate request processing 800 is performed at the information server that is the destination for the requested bookmarked document, then block 810 may not be required. Following block 810, the intermediate request processing 800 is complete and ends.

Figure 9:
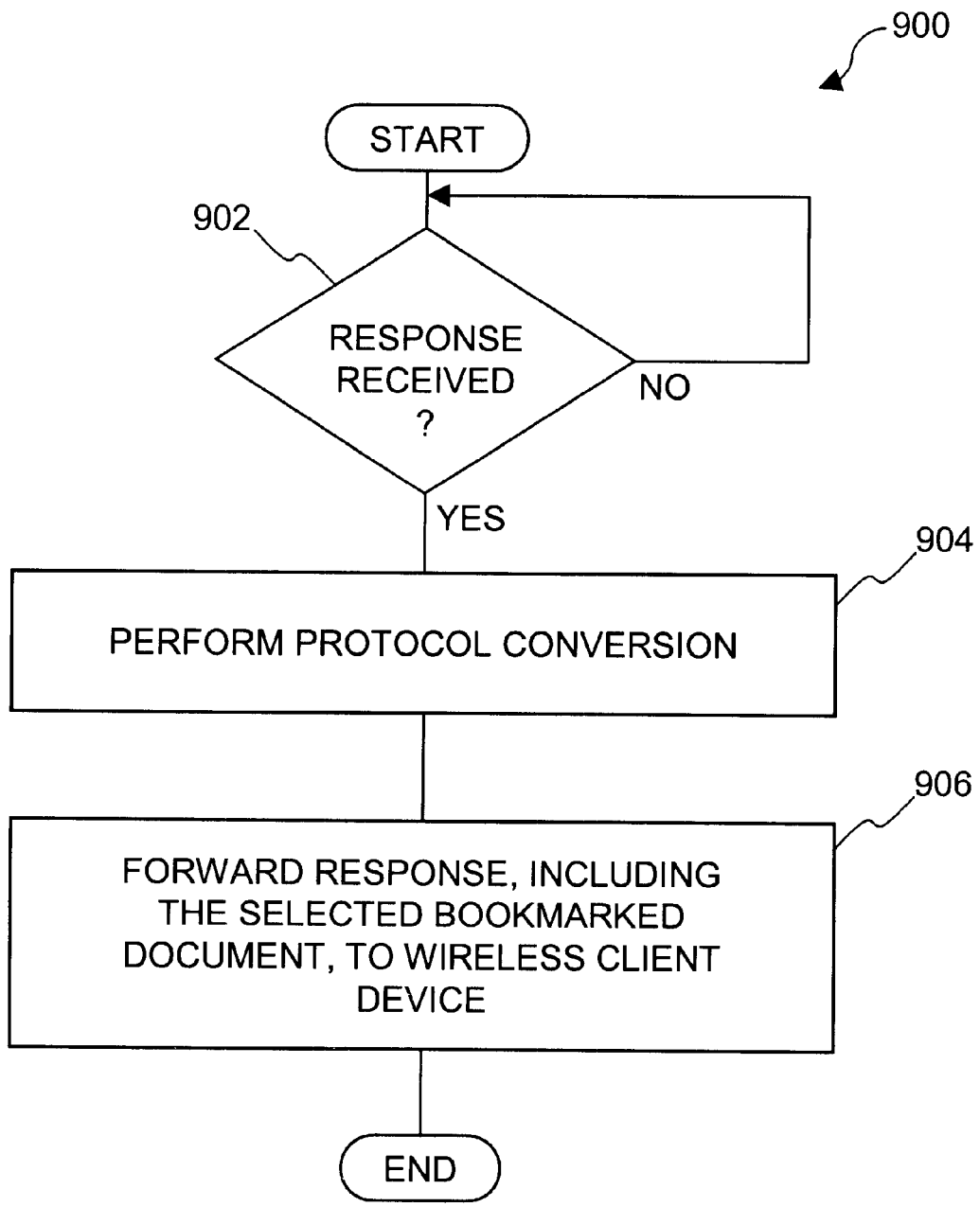
FIG. 9 is a partial flow diagram of intermediate server response processing according to one embodiment of the invention.

FIG. 9 is a partial flow diagram of intermediate server response processing 900 according to one embodiment of the invention. Often, the intermediate server will act as a network gateway or a proxy server for the wireless client device. Hence, in such cases, the response to the request that is transmitted to the information server (block 810) is returned to the wireless client device through the intermediate server. Hence, the intermediate server response processing 900 explains the return of the response from the information server through the intermediate server to the wireless client device. Namely, a decision block 902 determines whether the response has been received. If the response has not yet been received, the intermediate server response processing 900 is effectively waiting to receive the response. Once the response has been received, the intermediate server performs protocol conversion at block 904. For example, the protocol conversion can be from HTML to HDML. Then, the response is forwarded to the wireless client device at block 906. The response being forwarded to the wireless client device includes the selected bookmarked document that was originally requested by the wireless client device using the selection of a previously defined bookmark. Following block 906, the intermediate server response processing 900 is complete and ends.

The invention can also be embodied as computer readable code on a computer readable medium. The computer readable medium is any data storage device that can store data which can be thereafter be read by a computer system. Examples of the computer readable medium include read-only memory, random-access memory, CD-ROMs, magnetic tape, optical data storage devices. The computer readable medium can also be distributed over a network coupled computer systems so that the computer readable code is stored and executed in a distributed fashion.

It can be appreciated by now that the present invention provides an efficient means for users of wireless client devices to navigate information services over a network using bookmarks stored on a remote server. This invention allows users to navigate such information services with a minimal amount of input interaction (i.e., key strokes) and with efficient use of the wireless client devices bandwidth.

The advantages of the invention are numerous. Different embodiments or implementations may yield one or more of the following advantages. One advantage of the invention is that bookmarks are able to be selected with greater speed and ease. Another advantage of the invention is that between the wireless client device and an intermediate server (e.g., proxy server) a compact request format is used so as to substantially reduce the amount of data to be transmitted for a request. Still another advantage of the invention is that memory storage at the wireless client device to support bookmarks is reduced.

The present invention has been described in sufficient detail with a certain degree of particularity. It is understood to those skilled in the art that the present disclosure of embodiments has been made by way of example only and that numerous changes in the arrangement and combination of parts as well as operations may be resorted without departing from the spirit and scope of the invention as claimed. Accordingly, the scope of the present invention is defined by the appended claims rather than the forgoing description of embodiments.

What is claimed is:

1. A method for requesting a document on a remote server using a user interface of a wireless client device, the method comprising:

obtaining a compact bookmark identifier for a selected bookmarked document without keying in the compact bookmark identifier at the wireless client device when initiating a request for the selected bookmarked document; and transmitting a compact request including the compact bookmark identifier to a translation server, wherein the selected bookmarked document is chosen by a selection of a single button on the wireless client device, and wherein neither the compact bookmark identifier nor the compact request include a universal resource locator for the selected bookmarked document.

2. A method as recited in claim 1, wherein the selected bookmarked document is a web page.

3. A method as recited in claim 1, wherein the translation server is a proxy server.

4. A method as recited in claim 3, wherein the selection of the button is determined by depressing the button and holding the button depressed for at least a predetermined period of time.

5. A method as recited in claim 1, wherein the wireless client device includes a screen display, wherein the selected bookmarked document is further chosen without needing to first display a list of available bookmarks on the screen display of the wireless client device.

6. A method for utilizing bookmarks on a wireless client device, the method comprising:

selecting one of a plurality of bookmarks available to the wireless client device by selection of a single button on the wireless client device;

transmitting a compact request for the document or file represented by the selected bookmark from the wireless client device to an intermediate server;

obtaining, from the intermediate server, a universal resource locator for the document or file represented by the selected bookmark;

preparing a non-compact request for the document or file represented by the selected bookmark, the non-compact request including the universal resource locator for the document or file represented by the selected bookmark; and forwarding the non-compact request for the document or file represented by the selected bookmark to a remote server identified by at least a portion o the universal resource locator.

7. A method as recited in claim 6, wherein the document or file represented by the selected bookmark is a web page.

8. A method as recited in claim 7, wherein the intermediate server is a proxy server.

9. A method as recited in claim 6, wherein the selection of the button is determined by depressing the button and holding the button depressed for at least a predetermined period of time.

10. A method as recited in claim 9, wherein the wireless client device includes a screen display, wherein the selecting one of the plurality of bookmarks available to the wireless client device is performed by selection of a button on the wireless client device without needing to first display a list of available bookmarks on the screen display of the wireless client device.

11. A method as recited in claim 6, wherein the compact request being transmitted from the wireless client device to an intermediate server does not include the universal resource locator for the selected bookmark.

12. A method as recited in claim 6, wherein the obtaining of the universal resource locator comprises:

obtaining an identifier for the wireless client device or its subscriber from the compact request; and locating bookmark information associated with the identifier at the intermediate server; and retrieving, from the bookmark information, the universal resource locator for the document or file represented by the selected bookmark.

13. A method as recited in claim 12, wherein the selecting one of the plurality of bookmarks available to the wireless client device is performed by selection of a single button on the wireless client device.

14. A method as recited in claim 13, wherein the selection of the button is determined by depressing the button and holding the button depressed for at least a predetermined period of time.

15. In a wireless client device having a display and a keypad, a method of selecting among a plurality of information servers, the method comprising:
providing a dual function key on the keypad of the wireless client device, the dual function key having a primary function and a secondary function;
executing the primary function if the dual function key is pressed for less than a predetermined time period;
executing the secondary function if the dual function key is pressed for a time period greater than or equal to the predetermined time period, the execution of the secondary function producing a compact bookmark request; and
forwarding the compact bookmark request to an intermediate server device over a wireless network using a first communications protocol,
wherein the compact bookmark request is used to access bookmark information available to the intermediate server device to produce a request to one of the plurality of information servers that couple to the intermediate server device through a wired network using a second communications protocol, and
wherein said executing of the secondary function and said forwarding of the compact bookmark request are performed in response to a single press of the dual function key.

16. A method as recited in claim 15, wherein the first communications protocol for the wireless network is a wireless communications protocol and the second communications protocol for the wired network is Hypertext Transport Protocol (HTTP) over Internet Protocol (TCP/IP).

17. A method as recited in claim 15, wherein the wireless client device is selected from a group consisting of mobile telephones, pagers and Personal Digital Assistants having screen displays.

18. A computer readable medium including computer program code for requesting a page on a remote server using a user interface of a wireless client device, the computer readable medium comprising:
computer program code for obtaining a compact bookmark identifier for a selected bookmarked page without the user keying in the compact bookmark identifier at the wireless client device when initiating a request for the selected bookmarked document;
computer program code for detecting selection of a single button on the wireless client device, thereby selecting the selected bookmarked document;
computer program code for producing a compact request for the selected bookmarked page, the compact request including the compact bookmark identifier and not including a universal resource locator for the selected bookmarked page; and
computer program code for transmitting a compact request to a translation server.

19. A computer readable medium as recited in claim 18, wherein the computer program code for detecting selection of the button operates to determine when a button on the wireless client device has been depressed and held depressed for at least a predetermined period of time.

20. A computer readable medium as recited in claim 19, wherein the translation server is a proxy server.

21. A computer readable medium including computer program code for utilizing bookmarks on a wireless client device, the computer readable medium comprising:
computer program code for selecting one of a plurality of bookmarks available to the wireless client device by selection of a single button on the wireless client device;
computer program code for transmitting a compact request for the document or file represented by the selected bookmark from the Wireless client device to an intermediate server;
computer program code for obtaining, from the intermediate server, a universal resource locator for the document or file represented by the selected bookmark;
computer program code for preparing a non-compact request for the document or file represented by the selected bookmark, the non-compact request including the universal resource locator for the document or file represented by the selected bookmark; and
computer program code for forwarding the non-compact request for the document or file represented by the selected bookmark to a remote server identified by at least a portion of the universal resource locator.

22. A computer readable medium as recited in claim 21, wherein the document or file represented by the selected bookmark is a web page.

23. A computer readable medium as recited in claim 21, wherein the intermediate server is a proxy server.

24. A computer readable medium as recited in claim 21, wherein the computer program code for selecting to detect the selection of the button by determining whether the button has been depressed and held depressed for at least a predetermined period of time.

25. A computer readable medium as recited in claim 24, wherein the wireless client device includes a screen display,
wherein the computer program code for selecting one of the plurality of bookmarks available to the wireless client device is performed by detecting a selection of the button on the wireless client device without needing to first display a list of available bookmarks on the screen display of the wireless client device.

26. A computer readable medium as recited in claim 21, wherein the compact request being transmitted from the wireless client device to an intermediate server does not include the universal resource locator for the selected bookmark.

27. A computer readable medium as recited in claim 21, wherein the computer readable medium for obtaining of the universal resource locator comprises:
computer program code for obtaining an identifier for the wireless client device or its subscriber from the compact request;
computer program code for locating bookmark information associated with the identifier at the intermediate server; and
computer program code for retrieving, from the bookmark information, the universal resource locator for the document or file represented by the selected bookmark.

28. A computer readable medium as recited in claim 27, wherein the computer program code for selecting one of the plurality of bookmarks available to the wireless client device operates to detect selection of a button on the wireless client device.

29. A computer readable medium as recited in claim 28, wherein the computer program code for selecting to detect the selection of the button by determining whether the button has been depressed and held depressed for at least a predetermined period of time.

30. A wireless communication system, the system comprising:

a plurality of wireless client devices, each of the wireless devices including a keypad, a memory, a screen display and a processor, the processor operates to execute computer program code to generate a compact bookmark when a single key on the keypad is depressed and held for a predetermined time period; and a server device coupled to a wireless network servicing the wireless client devices, the server device provides storage for bookmark information for the wireless client devices, the bookmark information being stored associated with user accounts for the wireless communication devices, upon receiving a compact bookmark from one of the wireless communication devices the server produces a request to a remote server storing a document or file associated with the compact bookmark, the request being formed based on the compact bookmark and bookmark information.

31. A system as recited in claim 30, wherein the server device is a proxy server device that couples between a wired data network and a wireless data network, and wherein the wireless data network is capable of coupling to the wireless communication devices to facilitate communications between the proxy server and the wireless communication devices.

32. A system as recited in claim 31, wherein the wired data network uses a first communications protocol and the wireless data network uses a second communications protocol that differs from the first communication protocol.

33. A system as recited in claim 32, wherein the first communications protocol for the wireless data network is a wireless communications protocol and the second communications protocol for the wired data network is Hypertext Transport Protocol (HTTP) over Internet Protocol (TCP/IP).

34. A system as recited in claim 33, wherein the wireless communications protocol is selected from a group consisting of Wireless Application Protocol (WAP) and Handheld Device Transport Protocol (HDTP).

\* \* \* \* \*